United States Patent [19]
Kerker et al.

[11] 3,744,745
[45] July 10, 1973

[54] LIFTVANES

[75] Inventors: Richard Kerker, Los Angeles; Otis D. Wells, Lakewood, both of Calif.

[73] Assignee: McDonnell Douglas Corporation, Santa Monica, Calif.

[22] Filed: Sept. 30, 1971

[21] Appl. No.: 185,338

[52] U.S. Cl. .................................................. 244/41
[51] Int. Cl. ................................................. B64c 5/06
[58] Field of Search ................. 244/41, 42 R, 42 C, 244/42 CA, 42 CB, 42 CC, 53, 54, 55, 40 A

[56] References Cited
UNITED STATES PATENTS
3,471,107  10/1969  Ornberg ............................. 244/41

FOREIGN PATENTS OR APPLICATIONS
595,877  4/1960  Canada ............................. 244/40 A Primary Examiner—Milton Buchler
Assistant Examiner—Carl A. Rutledge
Attorney—Walter J. Jason, Robert O. Richardson et al.

[57] ABSTRACT

A set of lifting vanes attached to the sides of a body which protrudes forward from beneath the wing of an aircraft. The vanes are shaped and located to produce a significant downwash field contribution in the region of the wing leading edge aft of the protuberance.

6 Claims, 7 Drawing Figures

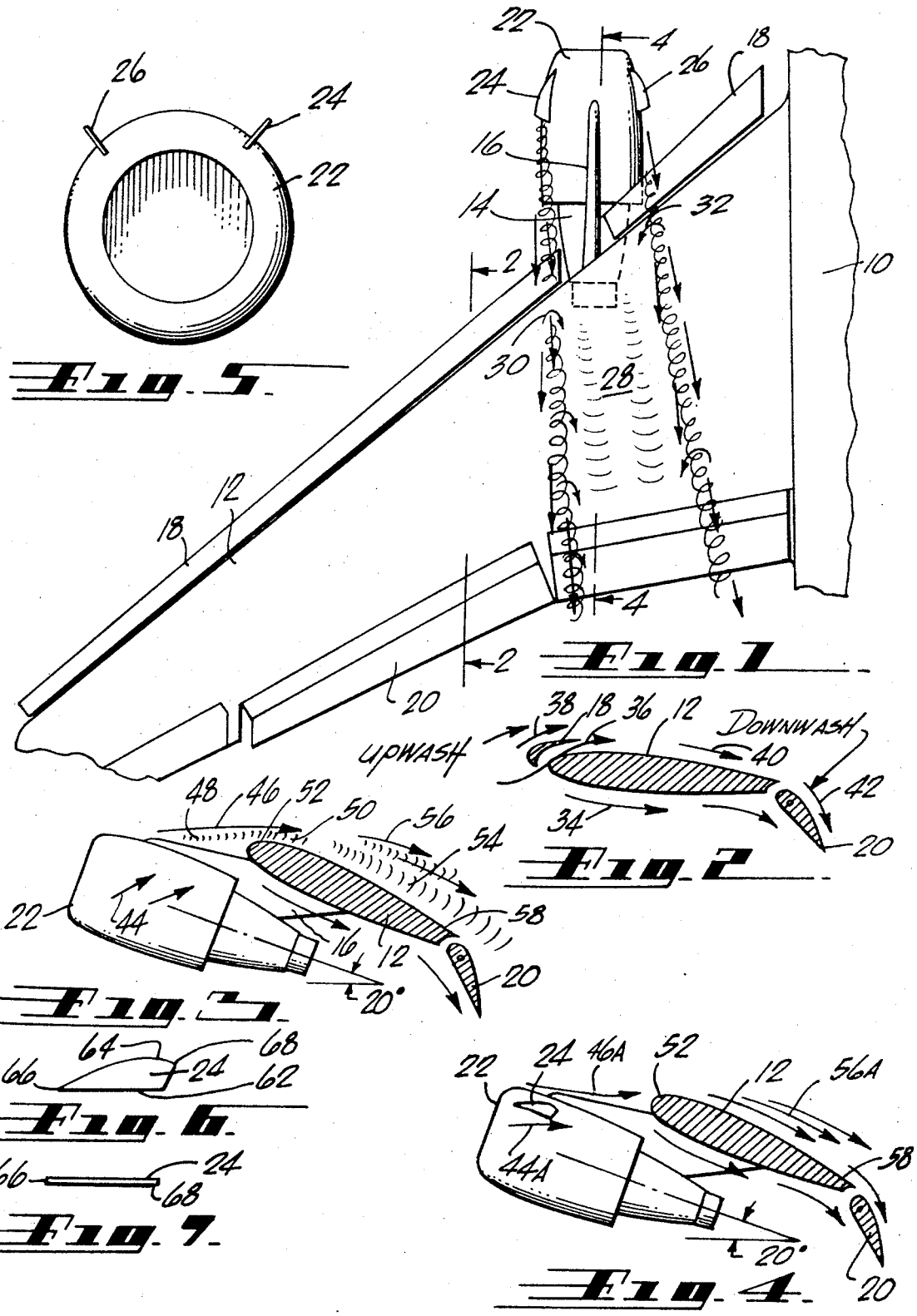

LIFTVANES

BACKGROUND OF THE INVENTION

As aircraft are becoming larger and heavier, they require progressively higher landing speed and takeoff speed and hence longer runways are required on which they may operate. Present day runways are being extended as far as possible to accommodate these larger and faster aircraft. One such new aircraft, popularly known as the DC-10 Trijet, is able to function on today's existing runways through its ability to takeoff and land at relatively lower airspeeds. This is because of a more efficient use of the airflow over the wing to provide for greater lift at the slower airspeed. In particular, one improvement is in the area rearwardly of the forwardly extending engine nacelles on the wings through the improvement in the lifting effect of that area.

SUMMARY OF THE PRESENT INVENTION

An improved lifting effect, in accordance with the present invention, is obtained rearwardly of wing mounted engine nacelles which protrude forwardly from beneath the wing of an aircraft. This is done by the provision of a pair of lift vanes attached to each nacelle in such manner that they preferably are contoured for small parasitic drag during normal cruising attitude of the aircraft, yet in operational conditions wherein high angles of attack are encountered, such as in landing or takeoff, the vanes oppose the strong upwash around the nacelle, reducing the flow separation on its upper areas, and providing a strong downwash marked by marginal trailing vortices. The resulting decrease in upwash in the interrupted slat region of the wing behind the nacelle delays the premature airflow separation, or "stall," normally encountered on the wing rearward from the engine.

BRIEF DESCRIPTION OF THE DRAWINGS

FIG. 1 is a plan view showing the airflow pattern generated by the nacelle mounted vanes with the vortices indicating the outer edges of the downwash field;

FIG. 2 is an elevational view taken along the line 2—2 of FIG. 1 showing the airflow pattern past the wing when the slats and flaps are extended;

FIG. 3 is an elevational view taken along the line 4—4 of FIG. 1, wherein the nacelle mounted vanes of the present invention are not used;

FIG. 4 is an elevational view of the same area, showing the effect of the nacelle mounted vanes of the present invention upon the airflow past the wing;

FIG. 5 is a front view of the nacelle showing a pair of the lift vanes mounted thereon;

FIG. 6 is a side view of one of the vanes; and

FIG. 7 is an edge view.

Referring now to FIG. 1 there is shown a fragmentary view of an aircraft 10 having a wing 12 with a nacelle 14 mounted thereon by means of pylon 16. This nacelle is mounted below and forward of the wing. A plurality of slats 18 along the leading edge of the wing are adapted to extend forward, as shown, when desired by the operator. Also extending rearwardly are flaps 20 which may be extended or retracted to vary the amount of lift and drag. Mounted on the forward portion of the engine nacelle 22 are a pair of lift vanes 24, 26 which produce an extensive downwash field 28, bordered by vortices having a rotation in the direction of arrows 30, 32, respectively.

Reference is now made to FIG. 2 showing the effect of aircraft over the wing 12 when the slat 18 and flap 20 are extended. As can be seen, air flows under the wing in the direction of arrow 34, upwardly and rearwardly between slat 18 and the leading edge of wing 12 in the direction of arrow 36 and over the slat 18 in the direction of arrow 38. The airflow over the wing continues along the upper surface as shown by arrow 40 and over the top surface of flap 20 shown by arrow 42. The upward airflow over the leading edge is known as upwash and the downward flow over the flap is known as downwash.

As shown in FIG. 3, there is a strong upwash shown by arrows 44 flowing rearwardly and upwardly over the nacelle sides 22. This upwash increases the upwash shown by arrow 46 due to wing lift in the vicinity of the wing pylon intersection. This causes severe separation on the local nacelle areas, shown at 48, and also tending to cause high suction pressure peaks 50 on the forward part 52 of the wing. This condition is further aggravated if, as is the usual case, the slats are interrupted by the pylon. The adverse pressure radiant 54 aft of the high suction peaks 50 promotes premature airflow separation, shown by arrow 56, at the wing trailing edge 58 forward of the flap 20.

As shown in FIG. 1, the vanes 24 produce the downwash field 28 indicated between the trailing vortices shown by arrows 30 and 32 in the vicinity of the wing leading edge 52. This field, in turn, reduces the high suction pressure peaks 50 on the wing leading edge 52 aft of the engine nacelle 14, tending, in turn, to delay the onset of airflow separation at the wing trailing edge 58, forward of the flap 20. This delay in airflow separation permits the wing to generate more lift.

As shown in FIG. 4, the vane 24 deflects the flow of air around the nacelle 22, as shown by arrows 44A and 46A, and over the leading edge 52 of the wing 12 with a less turbulent component and less disturbance flow. This reduces the upwash of the flow distrubance at the wing leading edge. The air then flows over the wing with less turbulance as shown by the arrows 56A and the lift effectiveness of flap 20 increased.

During the cruise position with the flaps 20 retracted, the lift vanes present a streamlined edge to the airflow. This can be seen in FIG. 5 wherein the lift vanes 24, 26 are shown at approximately 45° from horizontal in the fore-to-aft view of the engine.

The side view of one of th lift vanes 24 is shown in FIG. 6. Its lower edge 62 fits the contour of the engine nacelle to which it is to be mounted and its outer edge 64 in this embodiment is arcuate, terminating in a point 66 at its forward end. Its rearward end 68 extends from the inner edge 62 to such a height that the lift vane is effective in causing airflow deflection over a large enough area of the nacelle to bring about the desired improvement in wing lift. In one embodiment the optimum height was found to be approximately 10 inches or 10 percent of the nacelle frontal width or diameter.

FIG. 7 simply demonstrates that the vane 24 is of sufficiently small thickness, depending upon the structural requirements of the vane, to present a streamlined appearance to the airflow when the aircraft is in a cruise mode. Its length in use on one aircraft was approximately 30 inches.

Having thus described the preferred embodiment of the present invention it is to be understood that other modifications and variations will readily occur to those skilled in the art and it is to be understood that these deviations from the illustrative embodiment are to be considered as part of the invention as claimed.

We claim

1. In combination, an aircraft having a wing-mounted engine and engine nacelle thereon spaced from the aircraft fuselage and positioned below and forwardly of said wing, and
   a pair of vanes mounted on said engine nacelle to provide a deflected airflow over said nacelle whereupon said vanes reduce the separation and upwash over extensive regions of said nacelle and upper wing surface rearwardly of said nacelle.

2. The combination as set forth in claim 1 including wing flaps along the trailing edge of said wing for increasing the angle of attack of said wing relative to airflow thereby.

3. The combination as set forth in claim 1 wherein said wing has slats along the leading edge of said wing, and flaps along the trailing edge thereof, said slats and flaps when actuated increasing the wing maximum lift and thus also increasing the local angle of attack on said nacelle and on said vanes, said vanes thereby contributing the greater downwash field required to reduce airflow separation from the upper surface of said wing.

4. The combination as set forth in claim 1 wherein said wing has extensible slats along the leading edge of said wing and spaced laterally from said nacelle.

5. The combination as set forth in claim 1 wherein said vanes extend radially outwardly and upwardly from said nacelle, said vanes extending longitudinally along said nacelle approximately in the direction of airflow on said body in crusing flight attitude.

6. The combination as set forth in claim 5 wherein the vanes extend outwardly approximately 10 percent of the frontal width of the nacelle.

* * * * *